United States Patent
Kobayashi et al.

(10) Patent No.: US 10,815,362 B2
(45) Date of Patent: Oct. 27, 2020

(54) COMPOSITION, COMPOSITION FOR DOWNHOLE TOOLS, DEGRADABLE RUBBER MEMBER FOR DOWNHOLE, DOWNHOLE TOOL, AND METHOD FOR WELL DRILLING

(71) Applicant: Kureha Corporation, Tokyo (JP)

(72) Inventors: Takuma Kobayashi, Tokyo (JP); Hikaru Saijo, Tokyo (JP); Fuminori Kobayashi, Tokyo (JP); Takeo Takahashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/063,814

(22) PCT Filed: Dec. 14, 2016

(86) PCT No.: PCT/JP2016/087178
§ 371 (c)(1),
(2) Date: Jun. 19, 2018

(87) PCT Pub. No.: WO2017/110609
PCT Pub. Date: Jun. 29, 2017

(65) Prior Publication Data
US 2019/0300676 A1    Oct. 3, 2019

(30) Foreign Application Priority Data

Dec. 22, 2015    (JP) .................................. 2015-250408

(51) Int. Cl.
*E21B 33/12*    (2006.01)
*C08K 5/42*    (2006.01)
(Continued)

(52) U.S. Cl.
CPC .............. *C08K 5/42* (2013.01); *C08K 5/0033* (2013.01); *C08L 21/00* (2013.01); *E21B 33/12* (2013.01);
(Continued)

(58) Field of Classification Search
None
See application file for complete search history.

(56) References Cited

U.S. PATENT DOCUMENTS 10,280,699 B2 *   5/2019   Takahashi ............... C08L 75/04
2005/0205266 A1   9/2005   Todd et al.
(Continued)

FOREIGN PATENT DOCUMENTS

CN    101450985 A    6/2009
JP    2001-206982 A    7/2001
(Continued)

OTHER PUBLICATIONS

English translation of International Preliminary Report on Patentability and Written Opinion dated Jul. 5, 2018, in PCT International Application No. PCT/JP2016/087178 (Forms PCT/IB/338, PCT/IB/373, and PCT/ISA/237).

(Continued)

*Primary Examiner* — Andrew Sue-Ako
(74) *Attorney, Agent, or Firm* — Birch, Stewart, Kolasch & Birch, LLP (57) ABSTRACT

A composition for downhill tool, a degradable rubber member for downhole tool, a downhole tool, and a well drilling method are provided which contribute to cost reduction and process shortening and can contribute to improvement of production efficiency. The composition comprises a degradable rubber and a decomposition accelerator and comprises 0.1 to 20 parts by mass of at least one type of compound (Continued)

represented by the following general formula (I) per 100 parts by mass of the degradable rubber, the composition for a down hole tool includes the same, the degradable rubber member for down hole tool includes the same, and a well drilling method using the same.

[Chemical Formula 1]

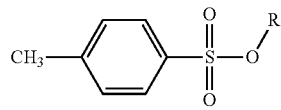

(I)

(In formula (I), R is an alkyl group having from 2 to 6 carbons).

17 Claims, 1 Drawing Sheet

(51) Int. Cl.
    *C08L 21/00*      (2006.01)
    *C08K 5/00*      (2006.01)

(52) U.S. Cl.
    CPC .... *E21B 33/1208* (2013.01); *C08K 2201/018* (2013.01)

(56) References Cited

U.S. PATENT DOCUMENTS

| | | | |
|---|---|---|---|
| 2009/0131285 A1* | 5/2009 | Wang | C09K 8/72 507/252 |
| 2010/0132959 A1 | 6/2010 | Tinker | |
| 2011/0067889 A1 | 3/2011 | Marya et al. | |
| 2011/0277989 A1 | 11/2011 | Frazier | |
| 2013/0292123 A1 | 11/2013 | Murphree et al. | |
| 2016/0053161 A1* | 2/2016 | Maeda | C09K 8/805 166/280.2 |
| 2016/0290083 A1 | 10/2016 | Takahashi et al. | |
| 2016/0298415 A1 | 10/2016 | Takahashi et al. | |
| 2017/0016298 A1 | 1/2017 | Takahashi et al. | |

FOREIGN PATENT DOCUMENTS

| | | |
|---|---|---|
| JP | 2003-238754 A | 8/2003 |
| JP | 2004-204093 A | 7/2004 |
| JP | 2010-254954 A | 11/2010 |
| JP | 2014051570 A | 3/2014 |
| JP | 2015071714 A | 4/2015 |
| JP | 2015-143458 A | 8/2015 |
| WO | WO 2015/098801 A1 | 7/2015 |
| WO | WO2015133545 A1 | 9/2015 |

OTHER PUBLICATIONS

Translation of International Search Report for PCT/JP2016/087178 dated Mar. 21, 2017.
Japanese Office Action, dated Sep. 3, 2019, for Japanese Application No. 2015-250408, with an English translation.
Communication Pursuant to Article 94(3) EPC dated Jul. 12, 2019, in European Patent Application No. 16 878 500.4.
Office Action dated Jun. 18, 2019, in Canadian Patent Application No. 3,008,587.
Ben et al., "Evaluation of quasi-isotropic plate and cylindrical shell fabricated with green composite sheets," Advanced Composite Materials (2013), vol. 22, No. 6, pp. 377-387.
Database WPI, Week 201548, Thomson Scientific, London, GB; AN 2015-38106C, XP002785909, & WO 2015/098801 AI (Kureha Chem Ind Co Ltd) Jul. 2, 2015 (Jul. 2, 2015) *abstract *.
Extended European Search Report dated Dec. 4, 2018, in European Patent Application No. 16878500.4.
Chinese Office Action and Search Report for Chinese Application No. 201680072802.0, dated Dec. 3, 2019, with an English translation.
Jianguo et al., "Special and Functional Polymer Materials," China Petrochemical Press, Oct. 31, 2004, p. 320, with an English translation.
Canadian Office Action and Search Report, dated Feb. 17, 2020, for Canadian Application No. 3,008,587.
Chinese Office Action for Chinese Application No. 201680072802.0, dated Jul. 7, 2020, with English translation.

* cited by examiner

COMPOSITION, COMPOSITION FOR DOWNHOLE TOOLS, DEGRADABLE RUBBER MEMBER FOR DOWNHOLE, DOWNHOLE TOOL, AND METHOD FOR WELL DRILLING

TECHNICAL FIELD

The present invention relates to a composition, a composition for downhole tools, a degradable rubber member for downhole tools such as a plug for well drilling, a degradable seal member, a degradable protecting member, a downhole tool, and a method for well drilling used in well drilling for producing hydrocarbon resources such as petroleum or natural gas.

BACKGROUND ART

Hydrocarbon resources such as petroleum or natural gas have come to be produced by excavation through wells (oil wells or gas wells, collectively called "wells") having a porous and permeable subterranean formation. In wells that are continuously excavated, the productive layer is stimulated in order to continuously excavate hydrocarbon resources efficiently from subterranean formations of which permeability has decreased over time and subterranean formations of which permeability has gradually become insufficient. In the meantime, methods for forming fractures (also called "fracturing" or "hydraulic fracturing") in the productive layer using fluid pressure have received attention.

Hydraulic fracturing is a method in which fractures are generated in the productive layer by fluid pressure such as water pressure (also simply called "hydraulic pressure" hereinafter). Generally, a vertical hole is drilled, and then the vertical hole is curved and a horizontal hole is drilled in a subterranean formation several thousand meters underground. Fracturing fluid is then fed into these boreholes (meaning holes provided for forming a well, also called "downholes") at high pressure, and fractures and the like are produced by the hydraulic pressure in the deep subterranean productive layer (layer that produces the hydrocarbon resource such as petroleum or natural gas), and the productive layer is thereby stimulated in order to extract and recover the hydrocarbon resource through the fractures. The efficacy of hydraulic fracturing has also been examined for the development of unconventional resources such as shale oil (oil that matures in shale) and shale gas.

In order to perform the above-mentioned well treatments, normally the method below is employed. Specifically, a prescribed section of a borehole (downhole) is partially plugged while isolating sequentially from the tip portion of the borehole, and fractures are produced or perforation is performed in the productive layer by feeding a fluid such as fracturing fluid at high pressure into the plugged section or using a tool containing an explosive compound such as a perforation gun. Then, the next prescribed section (typically ahead of the preceding section, i.e., a segment closer to the ground surface) is plugged, and fracturing and the like are performed, causing the fractures and perforations to advance. After that, this process is repeated until the required isolation, fracturing, and the like have been completed.

A variety of downhole tools, which are tools used in a well to perform plugging and fracturing of a borehole, are known. For example, Patent Documents 1 to 3 disclose plugs (also called "frac plugs", "bridge plugs", "packers", and the like) which plug or fix a borehole by various members (various elements) being disposed on the periphery of a core metal.

Patent Document 1 discloses an expandable and degradable plug in which a slip made of a metal or a seal made of an elastomer is disposed on the outer circumferential surface of a mandrel. Patent Document 2 discloses a degradable downhole plug comprising a slip, a conical member, or a malleable element formed from an elastomer or rubber or the like disposed on the outer circumferential surface of a mandrel, and an impediment such as a ball or flapper. Patent Document 3 discloses a biodegradable downhole tool (frac plug) in which a packer element assembly comprising a slip and a plurality of sealing elements is disposed on the outer circumferential surface of a long tubular body member.

Furthermore, Patent Document 4 discloses a sleeve system (also known as a "frac sleeve") that sequentially aligns a fracture sleeve piston (also known as a "piston" or "piston plug") that penetrates through a passageway to the center part in a movable manner to the axial direction of the sleeve and sequentially forms a closed vacuum using a ball sealer (also simply known as a "ball"), and a ball valve seat (also known as a "ball seat" or simply "seat").

Because downhole tools used for well drilling are sequentially disposed in the borehole until the well is completed and well treatments such as fracturing and perforation by high-pressure fluid are performed, they need to have sealing performance such that they plug (seal) the prescribed sections inside the borehole against the fluid pressure. At the same time, the seal needs to be easy to release when any well treatment is finished and the subsequent well treatment is to be performed. Additionally, the seal needs to be released and the used downhole tools removed at the stage when production of petroleum such as shale oil or natural gas such as shale gas (hereinafter also collectively called "petroleum and natural gas" or "petroleum or natural gas") or the like is begun. Because a downhole tool such as a plug is typically not designed to be retrievable after use and release of plugging, it is removed by destruction or by making it into small fragments by milling, drill out, or another method, but substantial cost and time are required for milling, drill out, and the like. There are also plugs specially designed to be retrievable after use (retrievable plugs), but since plugs are placed deep underground, substantial cost and time are required to retrieve all of them.

Additionally, downhole tools used in well drilling are arranged sequentially inside the well until the well is completed, and well treatment such as fracturing and perforation are carried out using high-pressure fluid. Then, various sensors, flow paths, and the like are arranged as downhole tool members in order that all well treatments can be completed, the seal can be released, and the next well treatment can be executed repeatedly in sequence. For these sensors, flow paths, and the like, when downhole tools are arranged inside a subterranean borehole, protection is performed by a protecting member or a protective coating so that breakage or damage does not occur due to friction, due to contact or collision with other members, or due to the high-pressure fluid used in well treatment. For example, a rubber material such a urethane rubber is used. When the sensors or flow paths are to perform their required functions, the protecting member or protective coating needs to be removed. Therefore, it has also come to be demanded that the protecting member for a downhole tool which protects the sensors, flow paths, and the like has a protective function for the sensors, flow paths, and the like, as well as a function of being easily removable or recoverable.

Patent Document 1 discloses that a slip or mandrel is formed from a degradable metal element such as a reactive metal. Patent Document 2 discloses having flappers, balls, and the like that degrade at a predetermined temperature, pressure, pH, or the like. Patent Document 3 discloses that a plug or member thereof is formed from a biodegradable material, but does not disclose specific uses. Furthermore, Patent Document 4 does not disclose that a frac sleeve is degradable.

Due to increased demand for securement of energy resources and environmental protection, excavation conditions are becoming increasingly harsh, such as increased depth, on the other hand, excavation is advancing under a diversity of excavation conditions, for example, a diversity of environmental conditions such as temperature conditions from less than 60° C. to approximately 200° C. attendant to the diversification of depth. Specifically, the downhole tool member used in downhole tools such as frac plugs, bridge plugs, packers, cement retainers, and sleeve systems (frac sleeves) need to have various properties. These properties include mechanical strength (tensile strength and compressive strength) to allow the member to be transported to a depth of several thousand meters underground, and oil-resistance, water-resistance, and heat-resistance such that mechanical strength and the like are maintained when the members come in contact with the hydrocarbon resource to be recovered in the high-temperature and high-humidity environment of a deep subterranean downhole. Furthermore, a downhole tool member, for example, a seal member for downhole tools (which qualifies as a rubber member for downhole tools) needs to have various characteristics such as seal performance such that it can maintain plugging even against high-pressure hydraulic pressure by sealing fluid between the downhole tool and the inner wall of the borehole, specifically the casing disposed inside the borehole, when the prescribed space of the downhole is plugged for performing perforation or fracturing, and at the same time, it needs to have the characteristic of being releasable when necessary. Additionally, downhole tool members need to have the characteristics of being both easily removable and capable of improving production efficiency by completely releasing the fluid seal within a desired period under the environmental conditions of the well at the stage when the well for well drilling is completed (as described above, there are a diversity of environments such as temperature conditions attendant to diversification of depth). Furthermore, protecting members for downhole tools need to have the characteristic of protecting sensors, flow paths, and the like while the downhole tools are disposed and during well treatment, and being releasable afterward.

Thus, there is a need for a degradable seal member for downhole tools that, by reliably sealing fluid between the downhole tools and the casing, makes various well treatments easy to implement in well drilling that requires sealing operations such as perforation and fracturing; and that is also capable of contributing to decreased expense and shortening of processes and contributing to improved production efficiency due to being designable according to desire so that the sealing function can be reliably maintained for a desired period and the seal can be released during a desired period and its removal and a flow path can be assured in diverse downhole environments. Furthermore, there is a need for a protecting member for downhole tools that is similarly capable of contributing to decreased expense and shortening of processes and contributing to improved production efficiency due to having the characteristic of protecting sensors, flow paths, and the like while the downhole tools are disposed and/or well treatment is performed, and being releasable afterward. Rubber members for downhole tools that fulfill these needs have been developed, but further development is sought (Patent Document 5).

CITATION LIST

Patent Literature

Patent Document 1: US Patent Application Publication No. 2011/0067889 specification
Patent Document 2: US Patent Application Publication No. 2011/0277989 specification
Patent Document 3: US Patent Application Publication No. 2005/0205266 Specification
Patent Document 4: US Patent Application Publication No. 2010/0132959 Specification
Patent Document 5: PCT International Publication No. 2015/133545

SUMMARY OF INVENTION

Technical Problem

A first aspect of the problem of the present invention is, due to the fact that excavation conditions for well drilling have become diverse such as increase depth, to provide a composition, a composition for downhole tools, a degradable rubber member for downhole tools that can be used in degradable seal members for downhole tools that, by reliably sealing fluid, make various well treatment processes easy to implement in well drilling that requires sealing operations such as perforation and fracturing; and that are also capable of contributing to decreased expense and shortening of processes and contributing to improved production efficiency due to being designable according to desire so that the sealing function can be reliably maintained for a desired period and the seal can be released during a desired period and its removal and a flow path can be assured in diverse downhole environments; and furthermore, that can be used in degradable protecting members for downhole tools that are similarly capable of contributing to decreased expense and shortening of processes and contributing to improved production efficiency due to having the characteristic of protecting sensors, flow paths, and the like while the downhole tools are disposed and/or well treatment is performed, and being releasable afterward. Another aspect of the problem of the present invention is to provide a downhole tool comprising the rubber member. Another aspect of the problem of the present invention is to provide a downhole tool comprising the rubber member.

Solution to Problem

As a result of diligent research to solve the above problems, the present inventors obtained a new composition that is formed by containing a prescribed amount of degradation accelerator in a degradable rubber. Using that composition, we discovered that the above-mentioned problems can be solved by forming a degradable rubber member for downhole tools and arrived to the completion of the present invention. That is, the present invention can be shown as follows.

The present invention is a composition including a degradable rubber and a degradation accelerator, wherein the composition includes from 0.1 to 20 parts by mass of at least one type of compound represented by general formula (I) as the decomposition accelerator per 100 parts by mass of the degradable rubber.

[Chemical Formula 1]

(I)

(In formula (I), R is an alkyl group having from 2 to 6 carbons).

Advantageous Effects of Invention

According to the present invention, it exhibits an effect that can provide a new composition, and a new composition for downhole tools, maintain a high effect of accelerating degradation that can easily remove degradable rubber material for downhole tools used in degradable seal members, degradable protecting member, and the like and additionally control the decrease of mechanical strength of the above-mentioned degradable rubber material for downhole tools. An effect is exhibited whereby it provides a degradable rubber member for downhole tools that can lower the cost and shorten the process of well drilling by having the above-mentioned effect.

According to the present inventors a new composition that is formed by containing a prescribed amount of degradation accelerator in a degradable rubber can be provided. Additionally, according to the present invention, it provides a composition for downhole tools containing that composition and additionally a degradable rubber member for downhole tools containing that composition for downhole tools. The composition, and the degradable rubber member for downhole tools of the present invention exhibits an effect that can maintain a high effect of accelerating degradation that can easily remove for downhole tools used in degradable seal members, degradable protecting member, and the like and control the decrease of mechanical strength of the degradable rubber material for downhole tools that has been formed.

By achieving results such as this, due to the fact that excavation conditions have become diverse, the degradable rubber member for downhole tools can be a degradable seal member that can be designed to reliably seals fluid and makes various well treatments easy based on diversification of excavation conditions, and that can be designed according to desire so that the seal can be released during a desired period and its removal and a flow path can be assured; and applied to a degradable protecting member that protects a sensor or a flow path and easily removes them afterward. Additionally, due to this, an effect is exhibited whereby it provides a degradable rubber member for downhole tools that can lower the cost and shorten the process of well drilling. Additionally, according to a different aspect of the present invention, an effect is exhibited whereby it provides a downhole tool equipped with the said component, and a method for well drilling.

DESCRIPTION OF EMBODIMENTS

I. Composition, and Composition for Downhole Tools

The composition due to the first aspect of the present embodiment includes a degradable rubber and a degradation accelerator and contains at least one type of compound represented by general formula (I) below as the degradation accelerator.

[Chemical Formula 2]

(I)

(In formula (I), R is an alkyl group having from 2 to 6 carbons.)

The composition of one embodiment includes a degradable rubber and a degradation accelerator and contains from 0.1 to 20 parts by mass of at least one type of compound represented by general formula (I) above as the degradation accelerator per 100 parts by mass of the degradable rubber.

The composition of the present embodiment has high degradability, which is accelerated by a degradation accelerator contained in that composition, yet can maintain the mechanical strength of a rubber material formed from that composition, so it can be used as a composition for all sorts of rubber materials that require properties and mechanical strength when disintegrating for a fixed period of time.

Additionally, the composition due to a different aspect of the present embodiment is a composition for downhole tools that contain the above-written composition.

The components and contents in the composition of the present embodiment are elaborated in the entry for a degradable rubber member for downhole tools below.

II. Degradable Rubber Member for Downhole Tools

Degradable rubber member for downhole tools of the present embodiment includes the above-mentioned composition. Specifically, the degradable rubber member for downhole tools of the present embodiment is formed from a composition (hereinafter also referred to as a rubber material) containing a prescribed amount of a degradation accelerator in a degradable rubber.

As an example, it is formed from a composition for downhole tools containing a composition that contains a prescribed amount of degradation accelerator in degradable rubber. Furthermore, the degradable rubber member for downhole tools of the present embodiment exhibits the effect of being capable of decreasing the expense and shortening the processes of well drilling by being applied to a degradable seal member for downhole tools or a degradable protecting member for downhole tools. The degradable rubber member for downhole tools of the present embodiment will be described using specific examples of, primarily, degradable seal members for downhole tools.

1. Degradable Rubber

As the degradable rubber serving as the rubber material that contains a prescribed amount of degradation accelerator and forms the degradable seal member (degradable rubber member) for downhole tools of the present embodiment, degradable rubbers that have been conventionally used to form degradable seal members for downhole tools may be used. As the degradable rubber contained in the rubber material that forms the degradable seal member for downhole tools, one type alone may be used, but a mixture of two or more types of degradable rubber may also be used.

Degradability

Degradability in the degradable rubber contained in the rubber material that forms the degradable rubber member (degradable seal member) for downhole tools means biodegradability, such that it is degraded by microorganisms in the soil in which the well treatment such as fracturing is performed; or means hydrolyzability, such that it is degraded by a solvent such as fracturing fluid, particularly by water, and also by acids or alkalis if desired, particularly, hydrolyzability, such that it is degraded by water of a predetermined temperature or higher; or means degradability, such that it can be degraded chemically by some other method. An example thereof also includes the state where the intrinsic strength of rubber decreases to become weak due to a decrease in the degree of polymerization or the like, resulting in the seal member (degradable rubber member) for downhole tools simply disintegrating and losing its shape when a very small mechanical force is applied (disintegrability).

Specific Examples of Degradable Rubber

Examples of the degradable rubber contained in the rubber material that forms the degradable seal member (degradable rubber member) for downhole tools of the present embodiment include a degradable rubber containing at least one type selected from the group consisting of urethane rubber, natural rubber, isoprene rubber, ethylene propylene rubber, butyl rubber, styrene rubber, acrylic rubber, aliphatic polyester rubber, chloroprene rubber, polyester-based thermoplastic elastomer, and polyamide-based thermoplastic elastomer. Further although they are nondegradable rubbers, they are capable of forming the degradable seal member for downhole tools by using a rubber material containing a prescribed amount of degradation accelerator, to be described later. In this case, these so-called nondegradable rubbers also qualify as the degradable rubber of the present invention.

In addition, from the perspective of degradability and disintegrability, preferred examples of the degradable rubber include degradable rubbers containing a rubber having a hydrolyzable functional group (for example, a urethane group, ester group, amide group, carboxyl group, hydroxyl group, silyl group, acid anhydride, acid halide, and the like). Note that "having a functional group" herein means having a functional group as a bond that forms the main chain of the rubber molecule, or, for example, having a functional group as a side chain of the rubber molecule serving as a cross-linking point. A particularly preferred example of the degradable rubber is a urethane rubber, because it is possible to easily control the degradability or disintegrability thereof by adjusting the structure, hardness, and degree of cross-linking of the rubber or by selecting other compounding agents. Particularly preferred degradable rubbers are those containing urethane rubber having a hydrolyzable urethane bond. Similarly, degradable rubbers containing a polyester-based thermoplastic elastomer or a polyamide-based thermoplastic elastomer are also preferred.

Urethane Rubber

The urethane rubber particularly preferably used as the degradable rubber contained in the rubber material that forms the degradable seal member (degradable rubber member) for downhole tools of the present embodiment (also called "urethane elastomer") is a rubber material having a urethane bond (—NH—CO—O—) in a molecule, and is normally obtained by condensation with an isocyanate compound and a compound having a hydroxyl group. As the isocyanate compound, aromatic (optionally having a plurality of aromatic rings), aliphatic, or alicyclic di-, tri-, or tetra-polyisocyanates or mixtures thereof are used. The compound having a hydroxyl group is broadly classified into polyester-type urethane rubbers having an ester bond in the main chain thereof (also called "ester-type urethane rubbers" hereinafter) and polyether-type urethane rubbers having an ether bond in the main chain thereof (also called "ether-type urethane rubbers" hereinafter). Ester-based urethane rubbers are preferred in many cases because their degradability and disintegrability are easier to control. Urethane rubber is an elastic body having both the elasticity (flexibility) of synthetic rubber and the rigidity (hardness) of plastic. Urethane rubber is generally known to have excellent abrasion resistance, chemical resistance, and oil resistance. Also, the urethane rubber exhibits high mechanical strength, high load tolerance, and high elasticity with high energy absorbency. Depending on the molding method, urethane rubber can be classified into i) kneaded (millable) type, which can be molded by the same processing methods as general rubber; ii) thermoplastic type, which can be molded by the same processing methods as thermoplastic resin, and iii) cast type, which can be molded by thermosetting process methods using liquid starting materials. Any type may be used as the urethane rubber that forms the degradable seal member for downhole tools of the present embodiment.

In particular, the iii) cast-type technique of molding urethane rubber is classified into two methods, the normal one-shot method and the prepolymer method. In the one-shot method, all reaction component starting materials are mixed by stirring in a reactor, the mixture is casted into a mold, and after the reaction is nearly completed by primary heat treatment, the product is released from the mold and then secondary heat treatment is performed. Although the one-shot method is highly economical, it is unfit for large-scale molding because the heating value is high. On the other hand, the prepolymer method is made up of two stages: a step of reacting polyol and diisocyanate in advance to synthesize a prepolymer, and a step of reacting the prepolymer with other missing starting materials to ultimately produce urethane rubber. According to the prepolymer method, there are many advantages such as the fact that a urethane rubber with high physical properties is obtained because the reaction proceeds uniformly, large-scale molding with low total heating value is possible, and segmented polyurethane with a freely selected curing agent can be produced. Nearly all cast urethane rubbers are produced by the prepolymer method.

Polyester-Based Thermoplastic Elastomer

The polyester-based thermoplastic elastomer that is preferably used as the degradable rubber contained in the rubber material that forms the degradable seal member (degradable rubber member) for downhole tools of the present embodiment is an elastomer containing a polyester-based block copolymer as the main component. Specific examples include block copolymers of a hard segment composed of polyester and a soft segment composed of polyether. Examples of the hard segment include aromatic polyesters and aliphatic polyesters, more specifically polyethylene terephthalate, polybutylene terephthalate, polyethylene naphthalate, polybutylene naphthalate, polyhydroxyalkanoic acid, and the like. Examples of the soft segment include polyethers such as polyethylene glycol, polypropylene glycol, polytetramethylene ether glycol, and the like. Other examples are block copolymers in which the hard segment and the soft segment are composed of polyesters. Examples of the hard segment include aromatic polyesters, more specifically polyethylene terephthalate, polybutylene terephthalate, polyethylene naphthalate, polybutylene naphthalate, and the like. Examples of the soft segment include aliphatic polyesters having lower elasticity than the elasticity of the hard segment, such as polyhydroxyalkanoic acids having an alkyl chain length of 2 or more. The types and the ratio of these hard segments and soft segments may be adjusted so as to conform to the desired physical properties of the elastomer, particularly the desired degradation characteristics and mechanical characteristics. Additionally, a polyester-based thermoplastic elastomer having the desired physical properties may be obtained by further combining various compounding agents as necessary. The polyester-based thermoplastic elastomer has the characteristics of both plastic and rubber, and can be molded by various molding processing techniques such as injection molding, extrusion molding, blow molding, or the like. Additionally, due to having an ester bond, the polyester-based thermoplastic elastomer has the characteristic of readily degrading or disintegrating in a prescribed time.

Polyamide-Based Thermoplastic Elastomer

The polyamide-based thermoplastic elastomer that is preferably used as the degradable rubber contained in the rubber material that forms the degradable seal member (degradable rubber member) for downhole tools of the present embodiment is a block copolymer of a hard segment composed of a polyamide and a soft segment composed of a polyether and/or polyester. Examples of the hard segment include aliphatic polyamides, more specifically Nylon 6, Nylon 11, and Nylon 12, and examples of the soft segment include polyethers such as polyethylene glycol, polypropylene glycol, polytetramethylene ether glycol, and the like. The types and the ratio of these hard segments and soft segments may be adjusted so as to conform to the desired physical properties of the elastomer, particularly the desired degradation characteristics and mechanical characteristics. Additionally, a polyamide-based thermoplastic elastomer having the desired physical properties may be obtained by further combining various compounding agents as necessary. The polyamide-based thermoplastic elastomer has intermediate properties between rubber and plastic, and can be molded by various mold processing techniques such as injection molding, extrusion molding, and blow molding. Additionally, due to having an amide bond, the polyamide-based thermoplastic elastomer has the characteristic of hydrolyzing and readily degrading or readily disintegrating at high temperature and high pressure.

Furthermore, nitrile rubbers or hydrogenated nitrile rubbers, which are rubbers that are conventionally used widely for downhole tools due to their excellent oil resistance, heat resistance, water resistance, and the like, often are not suitable as degradable rubber contained in rubber materials for forming the degradable seal member (degradable rubber member) for downhole tools of the present embodiment.

2. Degradation Accelerator

[Compounds of Formula (I)]

The degradation accelerator contained in the composition, the composition for downhole tools, and degradable seal member (degradable rubber member) for downhole tools of the present embodiment is a blended agent capable of accelerating degradation or disintegration of degradable rubber in the downhole environment in which the degradable seal member for downhole tools is used. In particular, it is a blended agent contained in a rubber material, capable of degrading a degradable rubber and especially accelerating hydrolysis of a degradable rubber. Due to the fact that it can be expected to reliably exhibit the effect of degrading degradable rubber, the degradation accelerator is a blended agent having the function of breaking the bonds of the main chain of the rubber molecule of degradable rubber or the function of plasticizing degradable rubber. The composition of the present embodiment contains at least one type of compound represented by general formula (I) below as a degradation accelerator.

[Chemical Formula 3]

(I)

Hereupon, in formula (I), R is an alkyl group having from 2 to 6 carbons. An alkyl group having from 2 to 6 carbons may be either straight-chain or branched-chain. Specific examples of the alkyl group having from 2 to 6 carbons include an ethyl group, propyl group, isopropyl group, tert-butyl group, n-pentyl group, isopentyl group, tert-pentyl group, sec-pentyl group, n-hexyl group, and isohexyl group.

Among these, an alkyl group having from 2 to 4 carbons is preferable. An alkyl group having from 2 to 3 carbons are more preferable, and the fact that it is an ethyl group makes it even more preferable. That is, if it is an ethyl group, the chemical compound in formula (I) above is ethyl p-toluenesulfonate (hereinafter also written as EPTS). Furthermore, from the perspective of it being low-priced, its easy availability, stability and storage stability, in the compounds of formula (I) above, R may be chosen from a group composed of an ethyl group, butyl group, and hexyl group.

The compounds in formula (I) above have a ester p-toluenesulfonate structure, so they generate acids by hydrolyzing in water. As also written in the items below, since acidic substances break the bonds of the main chain of the rubber molecule of the degradable rubber contained in the rubber material that forms the degradable seal member (degradable rubber member) for downhole tools, they accelerate degradation of the rubber member, and as a result, accelerate degradation of the degradable seal member for downhole tools. A degradation accelerator that has a structure similar to the above degrades by hydrolyzing even using the moisture in air and the like. The degradation accelerator of the present embodiment that has the above-mentioned structure is less easier to hydrolyze and is delayed to hydrolyze to some extent compared to methyl p-toluenesulfonate (MTPS), which has an alkyl group that has 1 carbon, as shown below, for example. Therefore, rubber material that has been made to contain this degradation accelerator can initially maintain surface hardness and control the decrease of mechanical strength, including the maximum point distortion due to the increase of the amount of additives, in rubber members that are formed from that composition. High pressure is exerted upon the seal member of a downhole tool, so the seal becomes difficult and unusable when the seal member's mechanical properties are low. Thus, a rubber member formed from the rubber material of the present embodiment can maintain the mechanical properties necessary for a seal member of a downhole tool and be suitably used in a seal member of a downhole tool.

Additionally, as a degradation accelerator that is contained in the composition of the present embodiment may contain at least two types of compound represented by general formula (I) above.

[Content of the Compounds of Formula (I)]

The content of the compounds of formula (I) per 100 parts by mass of degradable rubber is in the range of normally from 0.1 to 20 parts by mass, suitably from 0.3 to 15 parts by mass, and more suitably from 0.5 to 10 parts by mass. It has a degradation accelerating effect on degradable rubber by having its content of the chemicals in formula (I) in the above-written range. Furthermore, it is preferably a small amount less than 5 parts by mass, more preferably less than 3 parts by mass, and even more preferably less than 2 parts by mass, from the perspective of preventing bond breakage or deactivation of the curing agent during the curing reaction.

A composition, and a degradable seal member for downhole tools in one embodiment contains 0.1 to 20 parts by mass of at least one type of compound represented by general formula (I) above as that degradation accelerator per 100 parts by mass of the degradable rubber.

As a degradation accelerator may further contain other degradation accelerators in addition to at least one type of compound represented by general formula (I) above. In addition to the acidic substances and plasticizers exemplified below as preferred examples of other degradation accelerators, other substances that exhibit the effect of accelerating degradation, especially hydrolysis, of the degradable rubber may be used. The degradation accelerator may be one compound alone or may contain two or more compounds. Additionally, the state in which the degradation accelerator is contained may be phase-soluble or granular, but the acidic substance needs to be something that does not degrade, volatilize, or disappear during the time until the degradable seal member (degradable rubber member) for downhole tools is formed from the rubber material (during polymerization of the degradable rubber, during melt-kneading or melt-molding, and the like). The optimal range of content of the degradation accelerator may be selected depending on the combination of degradation accelerator and degradable rubber, but a degradation accelerator has a degradation accelerating effect on degradable rubber when the content thereof is in the range of normally from 0.1 to 20 parts by mass, suitably from 0.3 to 15 parts by mass, and more suitably from 0.5 to 10 parts by mass, per 100 parts by mass of the degradable rubber. When the content of degradation accelerator is too low, the degradation accelerating effect on the degradable rubber is unsatisfactory and there is risk that the degradable seal member for downhole tools will not degrade and the seal will not be released within the desired time, and the effects of reducing expense and shortening the processes of well drilling may be lost. When the content of degradation accelerator is too high, there is risk that the seal will be released before the time for which fluid sealing by the degradable seal member for downhole tools is required in well treatment such as fracturing has elapsed, which may cause major problems in well drilling. Thus, it is possible to control degradation speed by means of the type or content of the degradation accelerator. Due to the fact that the degradable seal member for downhole tools of the present embodiment is formed from a rubber material containing from 0.1 to 20 parts by mass of degradation accelerator per 100 parts by mass of degradable rubber, degradation of the degradable rubber is accelerated. Thus, releasing of the seal of the degradable seal member for downhole tools, which is performed after well treatment has ended or after well drilling has been completed, can be performed at a lower temperature and/or in a shorter time. As a result, the seal can be released in a desired time based on diversification of excavation conditions, and the expense of well drilling can be reduced and the processes are shortened. Additionally, because the degradable rubber contained in the rubber material that forms the degradable seal member for downhole tools can be degraded from the interior rather than from the surface of the seal member, the degradable seal member for downhole tools after the seal is released can be even more finely pulverized than in the past. As a result, the retrieval operation can be performed easily and rapidly after well treatment has ended or after well drilling has been completed.

Acidic Substance

Acidic substances are exemplified as other preferred degradation accelerators that are included in the composition, the composition for downhole tools, and the degradable seal member (degradable rubber member) for downhole tools of the present embodiment. As mentioned above, since acidic substances break the bonds of the main chain of the rubber molecule of the degradable rubber contained in the rubber material that forms the degradable seal member (degradable rubber member) for downhole tools, they accelerate degradation of the rubber member, and as a result, accelerate degradation of the degradable seal member for downhole tools. Specifically, it is hypothesized that when the degradable seal member for downhole tools is formed from a rubber material that is a degradable rubber containing an acidic substance, the acidic substance normally is present in a uniformly dispersed state in the degradable rubber, and thus, the acidic substance contacts the molecules of the degradable rubber substantially. As a result, degradation of the degradable rubber material proceeds at higher speed than when degradation proceeds from the surface of the seal member, as is the case when, for example, the degradable seal member for downhole tools formed from the rubber material is immersed in water (optionally containing an acidic substance).

The acidic substance may be an acidic substance in the narrow sense such as an acid, or it may be an acid-producing substance that hydrolyzes to produce acid under certain conditions, for example, when the substance is immersed in water. In addition to acids such as organic acids and inorganic acids, examples of acid-producing substances include acid-producing substances known themselves as acid precursors, such as derivatives of hydrolyzable acids such as dimers, trimers, oligomers, or polymers of oxycarboxylic acids, derivatives of highly reactive organic acids, sulfonamides, acid anhydrides, and the like, and preferably organic acid esters, inorganic acid esters, and acid anhydrides. The acidic substance needs to be a substance that does not degrade, volatilize, or disappear until the degradable seal member for downhole tools is formed from the degradable rubber material containing a prescribed amount of acidic substance (during polymerization of the degradable rubber, during melt-kneading or melt-molding, and the like). Specific examples include saturated fatty acids having from 8 to 20 carbons, such as lauric acid; oxycarboxylic acids, such as glycolic acid, lactic acid, phosphoric acid, glycolide, glycolic acid oligomer, polyglycolic acid (PGA), lactide, lactic acid oligomer, polylactic acid (PLA), and ε-caprolactone, or derivatives thereof; sulfonic acid derivatives, such as methyl p-toluenesulfonate (hereinafter may also be referred to as MPTS), o/p-toluenesulfonamide, and N-butylbenzene sulfonamide; acid anhydrides such as 3,3',4,4'-benzophenone tetracarboxylic acid dianhydride (BTDA); and the like.

Particularly preferably, the degradation accelerator contains at least one type selected from the group consisting of glycolide, lactide, ε-caprolactone, PGA, PLA, MPTS, and BTDA. The content of acidic substance as the degradation accelerator per 100 parts by mass of degradable rubber is not particularly limited, but it has a degradation accelerating effect on degradable rubber when the content thereof is in the range of normally from 0.1 to 20 parts by mass, suitably from 0.3 to 15 parts by mass, and more suitably from 0.5 to 10 parts by mass. Furthermore, the content of an acid such as glycolic acid is preferably a small amount less than 5 parts by mass, more preferably less than 3 parts by mass, and even more preferably less than 2 parts by mass, so that the acid does not cause bond breakage or deactivation of the curing agent during the curing reaction.

Plasticizer

Additionally, plasticizers are also exemplified as preferred degradation accelerators in the composition, and the degradable seal member (degradable rubber member) for downhole tools of the present embodiment. Plasticizers have a function of plasticizing (decreasing torque, softening, and the like) the degradable rubber contained in the rubber member that forms the degradable seal member (degradable rubber member) for downhole tools. This function accelerates infiltration of water (optionally containing an acidic substance or alkaline substance), which degrades, e.g., hydrolyzes, the degradable rubber in the degradable seal member (degradable rubber member) for downhole tools. Thus, it is hypothesized that, similar to what was described previously in regard to acidic substances, degradation of the degradable rubber proceeds more quickly than when degradation proceeds from the surface of the degradable seal member (degradable rubber member) for downhole tools. Examples of plasticizers include dibutyl phthalate, diisononyl phthalate, dioctyl phthalate, dioctyl adipate, diisononyl adipate, dibutyl sebacate, and the like. Since the presence or absence and the magnitude of the plasticizing effect on degradable rubber differs, the advantageous type of plasticizer is determined depending on the combination of the plasticizer and the degradable rubber. The content of plasticizer per 100 parts by mass of degradable rubber is not particularly limited, and the optimal range in which the plasticizer exhibits a degradation accelerating effect may be determined depending of the combination of plasticizer and degradable rubber as described previously. The plasticizer has a degradation accelerating effect on degradable rubber when the content thereof is in the range of normally from 0.1 to 20 parts by mass, suitably from 0.3 to 15 parts by mass, and more suitably from 0.5 to 10 parts by mass.

As the method for adding these degradation accelerators to the reaction component starting materials for producing the degradable rubber, for example, when the acidic substances are contained in cast-type urethane rubber described previously, addition is normally performed by pouring the degradation accelerators into the prepolymer. More specifically, the prepolymer is preheated to approximately 80° C. to 100° C., and a prescribed amount of degradation accelerator is added to the prepolymer while stirring, and after stirring for approximately 3 to 5 minutes, defoaming and temperature adjustment of the prepolymer are performed (or, the temperature may be adjusted after defoaming and then the degradation accelerator added). Then, the curing agent is added to the mixture, the resulting mixture is poured into a mold in which temperature is adjusted to a predetermined temperature, and primary vulcanization (primary heat treatment) is completed, after which secondary vulcanization (secondary heat treatment) is performed. In primary vulcanization, with cast-type urethane rubber, for example, it normally takes approximately 30 to 60 minutes from after mold release until the cast-type urethane rubber can maintain shape. It was found that when a degradation accelerator is added to the prepolymer, there are four types depending on the degradation accelerator: (1) a type with a typical vulcanization time, (2) a type with a vulcanization time shorter than typical vulcanization time, (3) a type that takes a longer time than typical vulcanization time, and (4) a type in which primary vulcanization does not proceed (it does not cure). There are also cases where the progression of primary vulcanization is suppressed (it does not cure) when bond breaking by the acid occurs in parallel. For example, an acid such as glycolic acid causes bond breaking even during the curing reaction and also deactivates the curing agent by reacting with it, and as a result, there are cases where the curing reaction does not proceed if the acid is contained in an amount of approximately 5 parts by mass per 100 parts by mass of cast-type urethane rubber. Thus, a degradation accelerator that can release acid over time, for example, in the course of using a degradable rubber member for downhole tools, is preferred, and acid-producing substances such as glycolide, lactide, ε-caprolactone, PGA, PLA, MPTS, or BTDA exemplified previously are preferred.

The degradation accelerator may be in a phase-soluble state or may be dispersed in granular state (also called "particulate") in degradable rubber contained in the rubber material that forms the degradable seal member (degradable rubber member) for downhole tools. For example, when a degradation accelerator is contained in the urethane rubber that is the degradable rubber, glycolide, lactide, glycolic acid, MPTS, and the like are often in the phase-soluble state, and from the perspective of melting point and the like, PGA, PLA, BTDA and the like are often in dispersed in the granular state. Furthermore, there are cases where lauric acid is dispersed in the phase-soluble state and the granular state depending on temperature conditions and the like, and cases where it bleeds out from the molded product have also been observed visually. In either case, there is an effect of accelerating degradation of the degradable rubber, but normally, the degradation accelerating effect is larger when the lauric acid is in a phase-soluble state. However, even when the lauric acid has been dispersed in granular or powder form with an appropriate dispersion diameter, there are no problems in use as long as it can degrade the degradable rubber member into a fine powder.

For example, after loading the prescribed amount of dispersant to a prepolymer that has been heated at 100° C., it is further heated at 100° C. for approximately 30 minutes to 2 hours depending on the phase-soluble state between the prepolymer and the degradation accelerator.

In one embodiment, the composition of the present embodiment includes a degradable rubber and a degradation accelerator, and the composition contains 0.1 to 20 parts by mass of at least one type of compound represented by general formula (I) above as that degradation accelerator per 100 parts by mass of the degradable rubber and includes at least one type of another decomposing agent mentioned above in addition to at least one type of compound represented by general formula (I) above as that degradation accelerator. The ratio of at least one type of compound represented by formula (I) and another degradation accelerator is not limited in particular, but the other degradation accelerator is preferably less than 50 parts by mass, more preferably less than 40 parts by mass, furthermore preferably less than 30 parts by mass, especially preferably less than 20 parts by mass and most preferably less than 10 parts by mass when the entire amount of degradation accelerator is set as 100 parts by mass, for example.

In one embodiment, the composition of the present embodiment includes a degradable rubber and a degradation accelerator, and the composition contains 0.1-2.0 parts by mass of at least one type of compound represented by general formula (I) above as that degradation accelerator per 100 parts by mass of the degradable rubber and includes MPTS in addition to at least one type of compound represented by general formula (I) above as that degradation accelerator.

For example, the composition of the present embodiment includes a degradable rubber and a degradation accelerator, and the composition contains 0.1 to 20 parts by mass of at least one type of compound represented by general formula (I) above as that degradation accelerator per 100 parts by mass of the degradable rubber and additionally includes MPTS in addition to EPTS as that degradation accelerator. Hereupon, for the ratio of EPTS and MPTS, MPTS is preferably less than 50 parts by mass, more preferably less than 40 parts by mass, furthermore preferably less than 30 parts by mass, furthermore preferably less than 20 parts by mass and especially preferably less than 10 parts by mass when the entire amount of degradation accelerator is set as 100 parts by mass, for example.

[Curing Agent]

Composition, and degradable seal member (degradable rubber member) for downhole tools of the present embodiment include the curing agent. The type and amount of curing agent is not limited in particular, and the type and concentration suitable to the combination of the degradable rubber, and the degradation accelerator explained earlier can be set. Examples include 3,3'-dichloro-4,4'-diaminodiphenylmethane (MOCA), dimethylthiotoluenediamene, isophoronediamine, piperazine, 1,3-propanediol, 1,4-butanediol, 1,6-hexanediol, neopentyl glycol, 1,4-cyclohexanedimethanol, hydroquinone (2-hydroxyethyl ether), 1,1,1-trimethylolpropane and glycerine. As an additive, it is used in the range of normally 1 to 30 parts by mass, suitably 3 to 20 parts by mass and more suitably 5 to 15 parts by mass per 100 parts by mass of degradable rubber.

3. Composition for Downhole Tools

Other Blended Components

The degradable seal member (degradable rubber member) for downhole tools of the present embodiment includes a rubber material that contains degradable rubber and a degradation accelerator, containing 0.1 to 20 parts by mass of at least one type of compound represented by formula (I) above as that degradation accelerator per 100 parts by mass of degradable rubber and is formed using that rubber material. The rubber material (composition for downhole tools) that forms the degradable seal member (degradable rubber member) for downhole tools may further contain, in addition to the degradable rubber and the prescribed amount of degradation accelerator, other resins (degradable polymers other than degradable rubber, and nondegradable resins or rubbers) and various additives such as stabilizers, colorants, and reinforcing materials as other blended components within a range that does not hinder the object of the present embodiment. In particular, the rubber material that forms the degradable seal member (degradable rubber member) for downhole tools may contain a reinforcing material. Furthermore, when the rubber material containing from 0.1 to 20 parts by mass of the compounds of formula (I) above per 100 parts by mass of degradable rubber contains degradable polymers other than degradable rubber or nondegradable resins or rubbers, preparation is performed such that the degradation accelerator is contained in an amount of 0.1 to 20 parts by mass per 100 parts by mass of degradable rubber.

Reinforcing Material

As reinforcing materials, materials such as resin materials conventionally used as reinforcing materials with the objective of improving mechanical strength or heat resistance may be used, and fibrous reinforcing materials or granular or powdered reinforcing materials may be used. The reinforcing materials may be contained typically in an amount of not greater than 150 parts by mass, and preferably in the range of 10 to 100 parts by mass, per 100 parts by mass of degradable rubber. When the rubber material that forms the degradable seal member (degradable rubber member) for downhole tools of the present embodiment contains a reinforcing material, it may be possible to perform sealing (protection, in a degradable rubber member) for the period required for treatment even when the downhole environment is close to the melting point (melt softening point) of the degradable rubber.

Examples of fibrous reinforcing materials include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyester resins, and acrylic resins; and the like. Short fibers having a length of not greater than 10 mm, more preferably 1 to 6 mm, and even more preferably 1.5 to 4 mm are preferable as the fibrous reinforcing materials. Furthermore, inorganic fibrous substances are preferably used, and glass fibers are particularly preferable.

As the granular or powdered reinforcing material, mica, silica, talc, alumina, kaolin, calcium sulfate, calcium carbonate, titanium oxide, ferrite, clay, glass powder (milled fiber or the like), zinc oxide, nickel carbonate, iron oxide, quartz powder, magnesium carbonate, barium sulfate, and the like can be used. These reinforcing materials may be each used alone or in combinations of two or more types. The reinforcing material may be treated with a sizing agent or surface treatment agent as necessary.

Other Resins

When acceleration of loss of sealing function is desired, degradable polymers other than degradable rubber, for example, polyglycolic acid, stereocomplex polylactic acid, polybutylene succinate, polybutylene adipate/terephthalate, polybutylene succinate/adipate, and the like, may be contained as other resins (degradable polymers other than degradable rubber, and nondegradable resins or rubbers) that may be further contained as other blended components within a range that does not hinder the object of the present embodiment.

Additionally, nondegradable resins and/or rubbers may be exemplified as other resins, specific examples of which include thermoplastic resins such as aromatic polyesters (polyethylene terephthalate and the like) and polystyrenes; and nondegradable rubbers such as nitrile rubber, hydrogenated nitrile rubber, and ethylene-propylene-diene terpolymer (EPDM). The content of the other resins when the rubber material contains other resins (degradable polymers other than degradable rubber, and nondegradable resins or rubbers) is within a range that does not hinder degradation of the degradable seal member (degradable rubber member) for downhole tools, normally not greater than 100 parts by mass and preferably not greater than 50 parts by mass per 100 parts by mass of degradable rubber.

4. Degradable Rubber Member for Downhole Tools

A degradable rubber member for downhole tools such as the degradable seal member for downhole tools of the present embodiment formed from a rubber material containing from 0.1 to 20 parts by mass of degradation accelerator per 100 parts by mass of degradable rubber may have the same configuration, structure, and shape as a degradable seal member for downhole tools or degradable protecting member for downhole tools, and may also have the same mechanical characteristics and the like as conventional members. As a result, the degradable rubber member for downhole tools of the present invention can be applied to the same applications and usage configurations as conventional members. Specific examples of degradable seal members for downhole tools will be described below.

Surface Hardness

It is preferred that the degradable rubber member for downhole tools of the present embodiment further has surface hardness in the range of A60 to D80 from the perspective of sealing function. The surface hardness of a rubber material that forms the degradable rubber member for downhole tools means the surface hardness expressed as type A (also called "surface hardness A" or simply "hardness A" hereinafter) or type D (also called "surface hardness D" or simply "hardness D" hereinafter) of durometer hardness measured in accordance with ISO 7619. Types of durometer hardness include type A for medium hardness suitable for general rubbers and the like, type D for high hardness suitable for hard rubbers and the like, and type E for low hardness suitable for sponges and the like (for example, hardness A100 is often roughly equivalent to hardness D60). Due to the fact that the hardness of the rubber material that forms the degradable rubber member for downhole tools of the present embodiment is in the range of A60 to D80, it can be configured such that borehole sealing can be performed while withstanding the high-pressure fluid pressurization such as fracturing and the like by also adjusting the structure and the like of the rubber member according to desire. The surface hardness of the rubber material that forms the degradable rubber member for downhole tools is more preferably in the range of A65 to D78, and even more preferably A70 to D75.

Additionally, "initial surface hardness" means the surface hardness before disintegration of the rubber member, for example, at the stage before immersion in water.

Degradation of Rubber Member within Downhole Environment

The degradable seal member (degradable rubber member) for downhole tools of the present embodiment is selected from those formed from a rubber material containing a prescribed amount of degradation accelerator of the present embodiment in a degradable rubber of the present embodiment. This allows the degradable seal member for downhole tools to lose its sealing function and release the seal due to degradation of the degradable rubber accelerated by the degradation accelerator within several hours to several weeks, or within several days according to desire, in the downhole environments described previously (attendant to diversification of depth, there are downhole environments at temperatures from approximately 60° C. (140☐) to 204° C. (400☐), and recently at low temperatures from approximately 25 to 40° C.). In the case of a degradable protecting member for downhole tools, it can release protection of sensors and flow paths and the exposed sensors and flow paths can exhibit their original functions.

Thus, a rubber member of the present embodiment, for example, has a surface hardness that is within the range of A60 to D80, and it can be a rubber member whose surface hardness is within the range of A0 to A60 after immersion in water for 7 days at 66° C.

As also shown in the working example shown below, in one example, in case of a degradable rubber member for downhole tools that is formed by containing a composition containing 1 part by mass of EPTS as degradation accelerator per 100 parts by mass of thermosetting polyurethane that has a surface hardness of A82, it has a surface hardness of A41 after 5 days, and a surface hardness of A21 after 7 days of immersion in water at a temperature of 66° C. (150 degrees F.). In case of a degradable rubber member for downhole tools that is formed by containing a composition containing 3 parts by mass of EPTS as degradation accelerator per 100 parts by mass of thermosetting polyurethane that has a surface hardness of A82, it has a surface hardness of A15 after 5 days, and a surface hardness of A0 after 7 days of immersion in water at a temperature of 66° C. (150 degrees F.). In case of a degradable rubber member for downhole tools that is formed by containing a composition containing 5 parts by mass of EPTS as degradation accelerator per 100 parts by mass of thermosetting polyurethane that has a surface hardness of A82, it has a surface hardness of A0 after 5 and 7 days of immersion in water at a temperature of 66° C. (150 degrees F.).

From the above, selecting the optimal combination of degradable rubber and degradation accelerator according to the above characteristics and downhole environment can contribute to reduced expense or shortening of processes for well drilling (recovery of hydrocarbon resources) because the substantial expense and time for retrieving or physically destroying the member for downhole tools for the purpose of releasing the plug (seal) of a space between a downhole tool such as a plug for well drilling and the casing or releasing the protection of sensors, flow paths, and the like become unnecessary. Additionally, the operations of retrieving or physically destroying various members for downhole tools can be made completely unnecessary, among other things, because the downhole tool comprises the degradable rubber member for downhole tools of the present embodiment as well as other members formed from degradable materials. A downhole tool such as a plug for well drilling comprising the degradable rubber member for downhole tools of the present embodiment needs to have a diversity of performance maintenance time and degradation time according to the environment such as downhole temperature and according to the processes carried out in that environment. The degradable seal member (degradable rubber member) for downhole tools of the present embodiment can have the characteristic of maintaining a sealing function for a certain time and then losing the sealing function and releasing the seal in a variety of downhole temperature environments, such as 177° C., 163° C., 149° C., 121° C., 93° C., 80° C., or 66° C., as well as 25 to 40° C. In the degradable seal member for downhole tools of the present embodiment, the factors that control the sealing function maintenance time or speed at which the sealing function is lost and the degree to which they can be controlled differ depending on the combination of types of degradation accelerator and degradable rubber, and can be adjusted by various techniques.

Shape and Size of Degradable Rubber Member for Downhole Tools

The shape and size of the degradable rubber member for downhole tools of the present invention are not particularly limited, and may be adjusted so as to be compatible with the type, shape, and size of the downhole tool comprising the degradable rubber member for downhole tools such as a degradable seal member for downhole tools or a degradable protecting member for downhole tools. For example, the degradable rubber member for downhole tools may have a shape such as a sheet shape (thin film shape, thick plate shape, and the like), rod shape (round rod shape, square pillar shape, and the like), rectangular shape (including a cuboid shape), ball shape, or other lump shape (regular shape, irregular shape, and the like). When the degradable seal member for downhole tools of the present invention is sheet-shaped or is a sealing material or packing material, it does not necessarily need to be a molded article having a certain shape. Furthermore, when the downhole tool comprising the degradable seal member for downhole tools of the present invention is a plug for well drilling or the like, a degradable seal member for downhole tools that is an annular molded article, and more specifically, it may be a degradable seal member for downhole tools in which an annular molded article is disposed on an outer circumferential surface orthogonal to the axial direction of a mandrel provided in the downhole tool, or it may be a degradable seal member for downhole tools provided in a plug for well drilling such as a frac plug or bridge plug, and further, it may be a degradable seal member for downhole tools that is a ball or a ball seat. Similarly, considering the shape and size of the sensors, flow paths, or the like to be protected, the degradable protecting member for downhole tools may be a sheet shape, a prescribed shape corresponding to the shape of the sensors or the like, or an irregular shape, and may be adjusted in size as necessary.

5. Method for Manufacturing Degradable Rubber Member for Downhole Tools

The method for manufacturing the degradable rubber member for downhole tools such as a degradable seal member for downhole tools of the present invention is not particularly limited. For example, a molded product of a prescribed shape is molded by injection molding, extrusion molding (including solidification-and-extrusion molding), centrifugal molding, compression molding, or another known molding method, using, as a molding starting material, a composition that is a rubber material containing a prescribed amount of degradation accelerator, a degradable rubber, and other blended components contained as desired, or, premolded products of appropriate shapes (for example, a rod, thick plate, or the like) is molded, and after machining such as cutting or perforating as necessary, they may be combined by known methods to produce a degradable rubber member for downhole tools.

II. Downhole Tool

According to the present invention, a downhole tool comprising the above degradable rubber member for downhole tools is provided. The type, shape, and size of the downhole tool are not particularly limited. For example, the degradable rubber member for downhole tools of the present invention may be used as a protecting member or as a seal member in a sleeve system (frac sleeve); a seal member such as a ball valve or flapper valve within a downhole tool; a seal member that can temporarily block fluid by being disposed in openings between a downhole tool and the casing; and seal members in many other seal applications, such as sealing a borehole, in which the seal member is present in a form that protects and seals by covering metal downhole tool members, sensors, flow paths, and the like by means of these metal portions expanding in diameter. From the perspective of more effectively exhibiting disintegrability which arises from degradability, which is a characteristic of the degradable rubber member for downhole tools of the present invention, a preferred downhole tool is a plug for well drilling, and more preferred is a frac plug or a bridge plug.

Plug for Well Drilling

As the downhole tool comprising the degradable rubber member for downhole tools of the present invention (also called "downhole tool of the present invention" hereinafter), a more preferred plug for well drilling has a known structure that comprises a mandrel (either solid or having a hollow portion) and various downhole tool members disposed on the outer circumferential surface orthogonal to the axial direction of the mandrel. Examples of downhole tool members include diameter-expandable annular seal members that expand in diameter and plug the spaces between downhole tools (plugs for well drilling) and the casing to seal fluid, and/or slips, wedges, rings, and other members that expand in diameter to fix the downhole tools (plugs for well drilling) and the casing each other, and those comprising known members for example, sensors and the like) may be used.

The downhole tool of the present invention comprises, for example, a degradable seal member (degradable rubber member) that is an annular molded article, and preferably, it comprises a degradable seal member that is an annular molded article disposed on the outer circumferential surface orthogonal to the axial direction of a mandrel. The downhole tool of the present invention may also comprise a degradable seal member for downhole tools that is a ball or a ball seat.

As other downhole tool members provided in the downhole tool of the present invention, mandrels, slips, wedges, rings, and the like may be selected from a range of those having the materials, shapes, sizes, mechanical characteristics, and the like conventionally used for the relevant downhole tool. Thus, for example, as a mandrel or the like, one formed from a degradable material may be used, and further, one formed from a material containing a reinforcing material may be used, and additionally, one formed from a composite with another member formed from another material may be used. Additionally, the mandrel may have a hollow portion, and the diameter thereof may vary along the axial direction, and the mandrel may also have fixture parts, steps, indentations, protrusions, or the like on the outer surface.

Sealing of Downhole Using Downhole Tool

To achieve reliable fluid sealing by a downhole tool, the degradable seal member (degradable rubber member) for downhole tools of the present invention can plug a space between the casing of a borehole and a downhole tool. For example, the degradable seal member may be an annular molded article, and preferably an annular molded article disposed on the outer circumferential surface orthogonal to the axial direction of a mandrel provided in the downhole tool, or a member that expands in diameter in a direction orthogonal to the axial direction as it shrinks in diameter due to being compressed in the axial direction, or a ball or ball seat.

Because the degradable rubber member for downhole tools of the present invention is formed from a rubber material containing from 0.1 to 20 parts by mass of degradation accelerator per 100 parts by mass of degradable rubber, it can have excellent fluid sealing capability. Fluid sealing capability can be measured by the following method. Specifically, (1) a sample (annular rubber member) cut to a certain shape with an outer diameter of 90 mm and inner diameter of 60 mm from a degradable rubber member for downhole tools is set in a jig to which an outer tube with an inner diameter of 103.1 mm and a core rod with an outer diameter of 60 mm are attached, (2) the sample (annular rubber member) is compressed in the axial direction of the jig, and the outer tube and core rod part of the jig are sealed by the sample (annular rubber member), (3) hydraulic pressure is applied, and the hydraulic pressure when the seal fails (in most cases, large deformation force is applied to the two ends of the sample, i.e., the annular rubber member, in the axial direction of the jig, and as a result, those sites break and the seal fails) (also called "breaking hydraulic pressure") is measured. The fluid sealing capability is considered excellent as long as the breaking hydraulic pressure is not less than 20 MPa, but it is preferably not less than 23 MPa, and more preferably not less than 26 MPa. The breaking hydraulic pressure of the degradable rubber member for downhole tools may be adjusted according to the type of degradable rubber, the type and content of the degradation accelerator, and the like.

III. Method for Well Drilling

According to the method for well drilling using the degradable rubber member for downhole tools of the present invention, for example, a method for well drilling in which fluid between a downhole tool and a casing is sealed using a downhole tool such as a plug for well drilling comprising the degradable seal member for downhole tools, and, according to a method for well drilling in which isolation treatment of a borehole is performed using the degradable rubber member for downhole tools of the present invention, for example, using a downhole tool such as a plug for well drilling comprising a degradable seal member for downhole tools, and then the downhole tool is degraded, specifically, all or part of the downhole tool such as a plug for well drilling comprising the degradable seal member for downhole tools is degraded, it is possible to design such that the seal by the degradable seal member for downhole tools that is plugging the borehole can be easily released within a desired period in the relevant downhole environment when fracturing of the prescribed sections is finished or when production of petroleum or natural gas or the like begins after well drilling is finished and the well has been completed. Similarly, in the method for well drilling using a downhole tool comprising a degradable protecting member for downhole tools, it is possible to design such that protection of the sensors, flow paths, or the like can be released within a desired period in the relevant downhole environment. As a result, according to the method for well drilling of the present invention, the substantial expense and time conventionally required for the operation of destroying the sealing function to release the seal after well treatment is finished or the well is completed, and the operation of releasing protection by a protecting member, and also for destroying or fragmentizing the member such as multiple plugs for well drilling or seal members or protecting members remaining in the well by crushing, perforation, or another method, become unnecessary. As a result, it is possible to decrease the expense and shorten the processes of well drilling.

Plugging of Borehole

To describe sealing and the release of sealing, in the downhole tool of the present invention, by applying force to the degradable seal member for downhole tools, for example, to a pair of rings in the axial direction of a mandrel, the degradable seal member for downhole tools expands in diameter in the direction orthogonal to the axial direction of the mandrel as it is compressed and shrinks in diameter in the axial direction, and the outward part in the direction orthogonal to the axial direction comes into contact with the inside wall of the downhole, and the inward part in the direction orthogonal to the axial direction comes into contact with the outer circumferential surface of the mandrel. As a result, the downhole tool can plug the space between the downhole tool and the downhole, and seal fluid. Furthermore, when the aforementioned plugging (sealing) or downhole protection or the like is performed in a downhole which is a high-temperature environment where the degradable rubber member for downhole tools ends up degrading in a short time, a treatment method can be employed in which the seal performance (strength and the like) and the protective function can be maintained for a desired duration by controlling the ambient temperature of the degradable rubber member for downhole tools by injecting fluid from above ground (cooldown injection).

Degradation of Downhole Tool

With the downhole tool such as a plug for well drilling of the present invention, the sealing function of the degradable seal member for downhole tools can be destroyed, and the member together with, as desired, downhole tool members other than the degradable seal member for downhole tools, such as degradable mandrels, slips, rings, or the like, can be easily removed by being degraded or disintegrated by a variety of means that are not only capable of biodegrading, hydrolyzing, or chemically degrading or dissolving them in a solvent by some other method but are also capable of disintegrating the degradation accelerator after fracturing of the prescribed sections is finished, typically when production of petroleum or natural gas or the like begins after well drilling is finished and the well has been completed. That is, the fact that the degradable seal member for downhole tools loses a seal function and is degraded as desired after isolation treatment of a borehole is performed using the degradable seal member for downhole tools of the present invention provides the following advantages: (i) the seal for preventing movement of fluid inside the well can be released within a desired period; (ii) unnecessary downhole tools that hinder production are easy to remove; (iii) a downhole tool that does not require crushing treatment before the start of production can be obtained by forming other members provided in the downhole tool from a degradable material such as PGA or PLA (more preferably, PGA); and (iv) it can be applied to various downhole tools used in a diversity of processes in which any sort of sealing is required, without limitation to downhole tools used in fracturing processes. The method for well drilling that protect sensors and the like using the degradable protecting member for downhole tools of the present invention also has the same advantages. Furthermore, it is preferred that the degradable rubber member for downhole tools remaining after the well treatment has been finished preferably disappears completely by the time production is begun. Even if the rubber member does not disappear completely, as long as the rubber member is in a state that its strength decreases and it can be disintegrated by stimulation such as water flow in the downhole, the disintegrated degradable rubber member for downhole tools can be easily retrieved by flowback or the like. This does not cause clogging in the downhole or fractures, and thus does not hinder production of the petroleum, natural gas, or the like. Additionally, normally, the higher the downhole temperature, the shorter the time required for degradation and strength decrease of the degradable rubber member for downhole tools. Furthermore, depending on the well, the moisture content in the subterranean formation is sometimes low, and in this case, degradation of the downhole tool can be accelerated by allowing the water-based fluid used during fracturing to remain in the well without recovering the downhole tool after fracturing.

Specific aspects of the present invention further provide: i) a method for well drilling, the method comprising sealing a borehole using the downhole tool comprising the degradable rubber member for downhole tools of the present invention, after which the degradable rubber member for downhole tools is degraded inside the borehole; ii) a method for well drilling, the method comprising sealing a borehole using the downhole tool comprising the degradable rubber member for downhole tools of the present invention and further comprising another member for downhole tools containing a degradable material (preferably PGA), after which the degradable rubber member for downhole tools is degraded inside the borehole; and iii) a method for well drilling, the method comprising performing a well treatment using the downhole tool comprising the degradable rubber member for downhole tools of the present invention, the downhole tool being disposed such that the degradable rubber member for downhole tools contacts another member for downhole tools and/or covers the other member for downhole tools, after which the degradable rubber member for downhole tools is degraded inside the borehole.

(Summary)

The present invention includes a degradable rubber and a degradation accelerator and contains 0.1 to 20 parts by mass of at least one type of compound represented by general formula (I) below per 100 parts by mass of the above-stated degradable rubber.

[Chemical 4]

(I)

(In formula (I), R is an alkyl group having from 2 to 6 carbons.)

Also, it is preferable that R is selected from the group consisting of an ethyl group, a butyl group and a hexyl group.

The present invention also provides a composition for a downhole tool containing the above composition.

The present invention further provides a degradable rubber member for a downhole tool formed by using the composition of the present invention.

The surface hardness of the degradable rubber member for down hole tool is within the range of A60 to D80, and the surface hardness after immersion in water at 66° C. for 7 days is preferably within the range of A 0 to A 60.

The degradable rubber member for a downhole tool is preferably selected from the group consisting of urethane rubber, natural rubber, isoprene rubber, ethylene propylene rubber, butyl rubber, styrene rubber, acrylic rubber, aliphatic polyester rubber, chloroprene rubber, polyester type thermoplastic elastomer or polyamide type thermoplastic elastomer.

In the degradable rubber member for a downhole tool, it is preferable that the degradable rubber contains a rubber having a hydrolyzable functional group.

In the degradable rubber member for a downhole tool, it is preferable that the composition for a downhole tool further contains a reinforcing material.

In addition, one aspect of the degradable rubber member for a downhole tool of the present invention is a seal member.

Another aspect of the degradable rubber member for a downhole tool of the present invention is an annular shaped body.

Further, it is preferable that the annular molded body is placed on an outer peripheral surface orthogonal to the axial direction of the mandrel provided in the downhole tool.

Still another embodiment of the degradable rubber member for a downhole tool of the present invention is a ball or a ball seat.

Still another embodiment of the degradable rubber member for a downhole tool of the present invention is a degradable protective member for a downhole tool.

Still another embodiment of the degradable rubber member for a downhole tool of the present invention is a plug for well bore excavation.

The present invention further provides a downhole tool including the degradable rubber member for a downhole tool.

In addition, one embodiment of the downhole tool of the present invention is a well bore digging plug.

The present invention further provides a well drilling method using a degradable rubber member for a downhole tool.

The present invention further provides a well drilling method for sealing a fluid between a downhole tool and a casing using the degradable rubber member for a downhole tool.

Furthermore, the present invention provides a well drilling method in which the downhole tool is decomposed after sealing treatment of the wellbore using the degradable rubber member for downhole tool.

The present invention further provides a downhole tool comprising a degradable rubber member for a downhole tool, wherein after sealing the wellbore, the degradable rubber for the downhole tool is characterized in that the member is decomposed.

The present invention further provides a downhole tool comprising a degradable rubber member for a downhole tool and further comprising a member for a downhole tool containing a degradable material, characterized in that the degradable rubber member for the downhole tool is decomposed in the well bore after being sealed.

Further, the present invention includes a degradable rubber member for a downhole tool, wherein the degradable rubber member for downhole tool is in contact with another downhole tool member and is characterized in that the downhole tool decomposable rubber member is disassembled in the wellbore after the wellbore process using a downhole tool arranged to cover the downhole tool member as well as a well drilling method.

Embodiments of the present invention will be described in further detail hereinafter using examples. The present invention is not limited to the examples below, and it goes without saying that various aspects are possible with regard to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Example 1: Preparation of Composition for Rubber Material and Formation of Solid Rubber Material Sample (Raw Material)

Pandex 380E (manufactured by DIC Corporation) which is a polyester type prepolymer as decomposable rubber, ethyl p-toluenesulfonate (EPTS) as a decomposition accelerator, 3,3'-dichloro-4,4'-diaminodiphenylmethane (MOCA) (manufactured by Tokyo Chemical Industry Co., Ltd.) was used as the raw material.

(Method for Preparing Composition for Rubber Material)

Pandex 380E was heated to 100° C. and EPTS was added to 1 part by mass based on 100 parts by mass of Pandex 380E while stirring. Next, after addition of EPTS, it was allowed to stand for 30 minutes in a state of being warmed at 100° C. Thereafter, the mixture was agitated again for 5 minutes and defoamed by vacuum. Depending on the compatibility of Pandex 380E with EPTS, the mixture was further heated at 100° C. for 30 minutes to 2 hours and then defoamed by vacuum. Subsequently, MOCA was added in an amount of 10 parts by mass based on 100 parts by mass of Pandex 380E, and the mixture was stirred at 100° C. for 5 minutes to prepare a composition for a rubber material.

(Method of Forming Solid Rubber Material Sample)

The obtained rubber material composition was poured into a mold. It was cured by heating at a temperature of 70 to 110° C. to prepare a solid rubber material sample.

Example 2

A rubber material composition was prepared in the same manner as in Example 1 except that EPTS was added in an amount of 3 parts by mass to 100 parts by mass of PANDEX 380E to prepare a solid rubber material sample.

Example 3

A rubber material composition was prepared in the same manner as in Example 1 except that EPTS was added to 5 parts by mass based on 100 parts by mass of PANDEX 380 E to prepare a solid rubber material sample.

Comparative Example 1

A rubber material composition was prepared in the same manner as in Example 1 except that no decomposition accelerator was added to prepare a solid rubber material sample.

Comparative Example 2

A rubber material composition was prepared in the same manner as in Example 1 except that glycolide was used as a decomposition accelerator in place of EPTS and added to 5 parts by mass based on 100 parts by mass of Pandex 380E to prepare a rubber material composition, of a rubber material sample.

Comparative Example 3

Methyl p-toluenesulfonate (hereinafter referred to as MPTS) was used instead of EPTS as a decomposition accelerator, and except for adding 1 part by mass to 100 parts by mass of Pandex 380E, a composition for a rubber material was prepared in the same manner as in Example 1, so that a solid rubber material sample was prepared.

Comparative Example 4

MPTS was used instead of EPTS as a decomposition accelerator, and except that MPTS was added in an amount of 5 parts by mass based on 100 parts by mass of PANDEX 380E, a composition for a rubber material was prepared in the same manner as in Example 1, so that a solid rubber material sample was prepared.

Example 5

(Evaluation Test 1: Decomposition Test by Dipping the Rubber Material Sample in Water)
<Test Method>

5 g of the obtained rubber material sample and 50 ml of ion exchanged water were placed in a 50 ml vial bottle and stored in a thermostat set at a predetermined temperature (57° C., 66° C., or 80° C.) for a certain period of time. Solid rubber material samples were taken out from the water from the vial with time and solid-liquid separation was performed using a filter. The solid obtained after separation was allowed to stand in a dry room at a dew point of −40° C. or less and dried for 12 hours. After drying, the surface hardness of the rubber material sample was measured using a durometer type A (GS-719N, manufactured by Teclock Co., Ltd.). Surface hardness was measured 3 seconds after applying 5 kg heavy load. Also, as the immersion time, the hardness at each time point of 0 days (before immersion), 1 day, 3 days, 5 days and 7 days was measured.
<Results>

Figure 1:
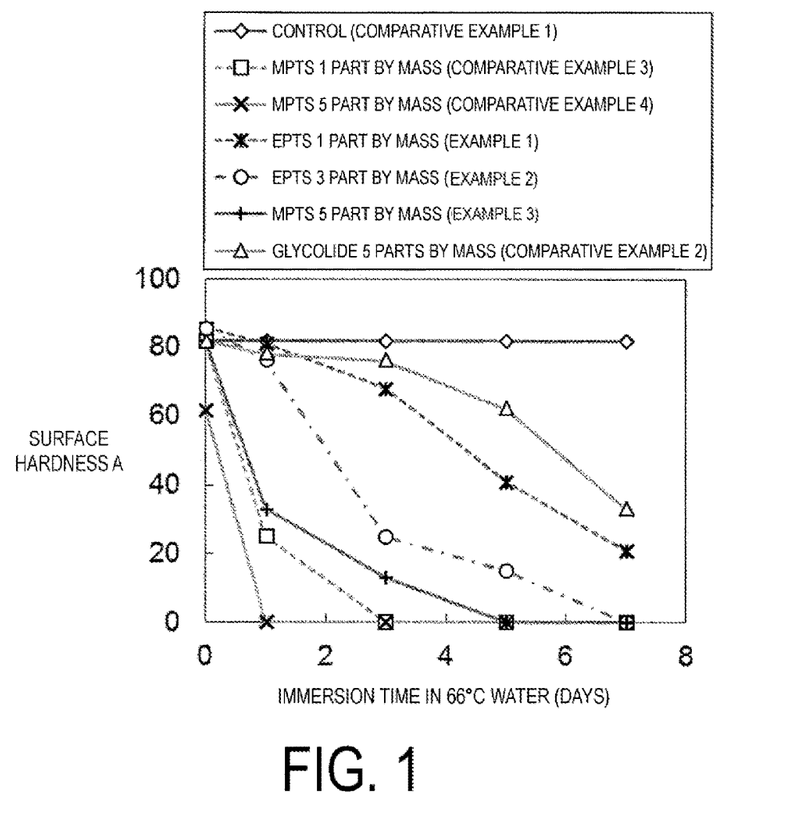
FIG. 1 Measurement results of surface hardness of rubber material samples of the working example and comparative example after each day of immersion in water at 66° C. are shown.

The results are shown in FIG. 1. FIG. 1 shows the measurement results of the surface hardness of the rubber material samples of examples 1 to 3 and comparative examples 1 to 4 at the time of immersion in water at 66° C. for each day.

As shown in FIG. 1, in Examples 1 to 3 in which the decomposition accelerator was EPTS as compared with Comparative Example 2 in which the decomposition accelerating agent was glycolide, excellent decomposition accelerating effect showed. This was thought to be due to the strength of the acid formed after ester hydrolysis.

The acid dissociation constant pKa is stronger as the value is lower, but the pKa value of glycolic acid is 3.83, and the p-toluenesulfonic acid is −2.8.

Also in Comparative Examples 3 and 4 where the decomposition accelerator is MPTS, as in Examples 1 to 3, although the decomposition accelerating effect is higher as compared with Comparative Example 2 in which the decomposition accelerator is glycolide, the rate of decrease in the surface hardness of Comparative Examples 3 and 4 is faster than those of Examples 1 to 3, especially in Comparative Example 4, where before dipping in water a decrease in the initial surface hardness due to hydrolysis due to moisture or the like in the air was observed.

Also at 57° C. and 80° C., the same results as those at 66° C. were obtained.

Example 6

(Evaluation Test 2: Maximum Point Stress of Rubber Material Sample)
<Test Method>

From the rubber material samples produced in each of Examples 1 to 3 and Comparative Examples 3 to 4, a tensile dumbbell-shaped test piece (total length: 100 mm, gauge length: 20 mm, narrowed portion: 5 mm) was prepared, and using a tensile tester (AG-X/R, manufactured by Shimadzu Corporation) to find the value at the time of breakage defined as the maximum point stress, the tensile stress was measured at 23° C. at a tension speed of 500 mm/min.

<Results>

Figure 2:
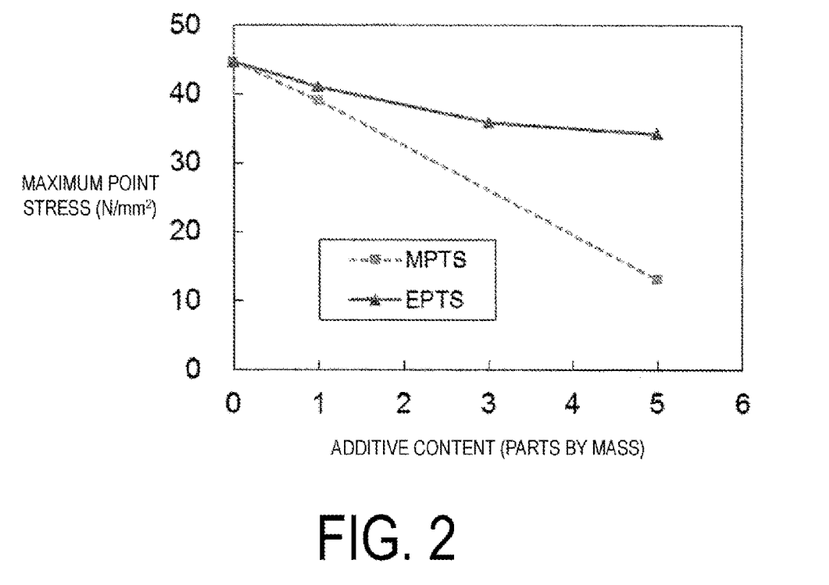
FIG. 2 Measurement results of tensile test of rubber material samples of the working example and comparative example are shown.

The results are shown in FIG. 2. FIG. 2 shows the measurement results of the tensile test of the rubber material samples of Examples 1 to 3 and Comparative Examples 3 and 4.

As shown in FIG. 2, in each of the rubber material samples of Examples 1 to 3 and Comparative Examples 3 and 4, the maximum point stress in the tensile test decreased as the content of the decomposition accelerator increased.

When comparing Examples 1 to 3 and Comparative Examples 3 and 4, in Comparative Examples 3 and 4 in which MPTS was used as a decomposition accelerator, the maximum point stress markedly decreased. In contrast to this, in Examples 1 to 3 in which EPTS was used as a decomposition accelerator, constant maximum stress was maintained regardless of the content of the decomposition accelerator.

As shown from the results of the above evaluation tests 1 and 2, in the rubber materials of Examples 1 to 3 using EPTS as a decomposition accelerator, while maintaining the initial surface hardness and exerting a high decomposition promoting effect, a decrease in mechanical strength was suppressed. From this, it was found that by adding EPTS as a decomposition accelerator to the rubber material, a rubber material excellent in balance between the decomposition promoting effect and the mechanical strength can be obtained.

INDUSTRIAL APPLICABILITY

A decomposable rubber member for a downhole tool formed from a rubber material containing the composition of the present invention which, as the mining conditions diversify, seals fluids reliably to facilitate well processing, and releases the seal for the desired period in order to remove it and secure the flow path, that is decomposable seal member that can be designed as desired to protect sensors and flow paths, by being a degradable protective member that can be designed to be easily removable thereafter, making it possible to provide a degradable rubber member for a downhole tool which can reduce the cost of well drilling and shorten the process, and furthermore a down hole tool including the member and a well drilling method, with high industrial applicability.

The invention claimed is:

1. A degradable rubber member for a downhole tool formed of a composition comprising a degradable rubber and a decomposition accelerator,
   wherein the degradable rubber is a urethane rubber, and the decomposition accelerator is at least one of a compound represented by general formula (I), and
   wherein the composition comprises from 0.1 to 20 parts by mass of the compound per 100 parts by mass of the degradable rubber;

(I)

where, R is an alkyl group having from 2 to 6 carbons.

2. The degradable rubber member for a downhole tool according to claim 1, wherein
   the surface hardness of the degradable rubber member for a downhole tool is within the range of A60 to D80 and the surface hardness after immersion in water at 66° C. for 7 days is within the range of A0 to A60.

3. The degradable rubber member for a downhole tool according to claim 1, wherein the composition further contains a reinforcing material.

4. The degradable rubber member for a downhole tool according to claim 1, which is a seal member.

5. The degradable rubber member for a downhole tool according to claim 4, which is an annular formed body.

6. The degradable rubber member for a downhole tool according to claim 5, wherein the annular molded body is placed on an outer peripheral surface orthogonal to an axial direction of a mandrel provided in the downhole tool.

7. The degradable rubber member for a downhole tool according to claim 1, which is a ball or a ball seat.

8. The degradable rubber member for a downhole tool according to claim 1, which is a degradable protective member for a downhole tool.

9. The degradable rubber member for a downhole tool according to claim 1, wherein the member is provided in a plug for well drilling.

10. A downhole tool comprising the degradable rubber member for a downhole tool according to claim 1.

11. The downhole tool according to claim 10, wherein the tool is a plug for well drilling.

12. A well method characterized in that the degradable rubber member for a downhole tool is disassembled in a wellbore after sealing the wellbore using the downhole tool according to claim 10.

13. A method for well drilling, the method comprising:
   drilling a well and forming a borehole; and
   sealing the borehole with the degradable rubber member for a downhole tool described in claim 1.

14. A method for well drilling, the method comprising sealing fluid between a downhole tool and a casing using the degradable rubber member for a downhole tool described in claim 1.

15. A method for well drilling, the method comprising performing isolation treatment of a borehole using the degradable rubber member for a downhole tool described in claim 1, after which the downhole tool is degraded.

16. A downhole system comprising:
   a downhole tool comprising the degradable rubber member for a downhole tool according to claim 1; and
   further comprising another member for a downhole tool containing a degradable material, characterized in that, after sealing the hole, the degradable rubber member for the downhole tool is decomposed in the well bore.

17. A method for well drilling, the method comprising:
   performing a well treatment using a downhole tool comprising the degradable rubber member for a downhole tool described in claim 1, the downhole tool being disposed such that the degradable rubber member for the downhole tool contacts and/or covers another member for a downhole tool, after which the degradable rubber member for the downhole tool is degraded inside the borehole.

* * * * *